2,784,170
HEAT-STABILIZED POLYCHLOROTRIFLUORO-ETHYLENE UTILIZING METAL NITRITES

Andrew T. Walter, South Charleston, and Donald M. Young, Charleston, W. Va., assignors to Union Carbide and Carbon Corporation, a corporation of New York No Drawing. Application April 23, 1953,
Serial No. 350,764

6 Claims. (Cl. 260—45.9)

This application relates to an improvement in polychlorotrifluoroethylene resins. More particularly it is concerned with the stabilization of such resins at temperatures required for molding or extruding operations by dispersing intimately therein certain inorganic compounds as for instance a salt of an oxyacid of nitrogen.

Polycholorotrifluoroethylene is a crystalline polymer melting at about 205° C. Its melting point is rather sharp, and similar in kind to that of polyethylene at 115° C. Its viscosity at temperatures above its melting point is high. For instance, the numerical expression of the melt-viscosity of a grade preferred for injection-molding is approximately twenty-five times as great as that of the melt-viscosity of a commercial grade of polyethylene commonly used for extrusion and molding operations (sold under the trade name "Bakelite" polyethylene DYNH) at temperatures which are approximately 25° C. above their respective melting points. Also, the comparatively gradual decrease in viscosity with increase in temperature which is a characteristic of polyethylene is also observed with polychlorotrifluoroethylene. Were it possible to take melt-viscosity alone as the index of suitable performance of the resin for molding and extrusion operations the temperature that would be required to render a polychlorotrifluoroethylene resin equivalent to polyethylene at 150° C. would be about 360° C. (extrapolated). Furthermore, under high shearing forces, hot polychlorotrifluoroethylene has a tendency to crumble rather than flow, a tendency attributable to low intermolecular cohesion.

Because of these and other characteristics, the temperatures used in processing polychlorotrifluoroethylene, as by injection molding extrusion or the like are necessarily high. The operating temperature of the high order that is required falls within the temperature region in which breakdown in vacuum of all vinyl and diene polymers to gaseous materials within a short time has been observed. According to Research Paper RR–1938; National Bureau of Standards (L. A. Wall) complete decomposition of such a polymer within a short time is observed at 400° C. Mass spectrometer analyses, made in connection with the present improvement, of gases involved at elevated temperatures from a polychlorotrifluoroethylene resin indicate that the degradation from the polymer to the chlorotrifluoroethylene monomer, although very small, is measurable at temperatures between 250° and 300° C. Above 300° C., the analyses also indicate, the rate of decomposition increases rapidly, and at about 375° C. the rate is so rapid that decomposition can be accomplished almost quantitatively in thirty minutes. Weight loss measurements, also made in connection with our improvement, have shown that at temperatures of 300° C. and 325° C. in open crucibles, fifty percent of the polychlorotrifluoroethylene resin is lost within fifty-seven and twelve hours, respectively; and that at temperatures of 340° to 350° C. the weight loss during the first hour of heating is extremely high. Although this loss in weight might be attributable in part to the evaporation of resin of low molecular weight, the seriousness of the depolymerization tendency is pointed up by the tests, nevertheless.

Melt-viscosity determinations on specimens which have been aged for varying lengths of time at temperatures ranging from 250° C. to 330° C. also provide a useful index of polymer breakdown. The method for determining melt-viscosity used herein is that described by G. J. Dienes and H. F. Klemm in the Journal of Applied Physic for June 1946 (vol. 17, No. 6, pp. 458–471). Upon being subjected to temperatures above 330° C. the melt viscosity, at 230° C., of even the most stable polymer samples falls below 0.05 megapoise within a short time. A resin having a melt-viscosity at 230° C. of 0.05 megapoise or less is very weak and can easily be broken by hand, and at melt-viscosities of about 0.5 megapoise the increase in brittleness and the decrease in ultimate elongation is substantial. Typical data on the relationship of physical properties and melt-viscosities at 230° C. are given in the following table:

TABLE I

Comparison of melt-viscosities and physical properties of polychlorotrifluoroethylene

| Sample No. | 230° C. Melt Viscosity, Megapoises | Tensile Strength, p. s. i. | Ultimate Elongation, Percent | Brittle Temperatures, ° C. |
|---|---|---|---|---|
| 1 | 44 | 5,000 | 120 | +15 |
| 2 | 16 | 5,710 | 129 | +10 |
| 3 | 5.2 | 5,590 | 58 | +14 |
| 4 | 1.9 | 5,700 | 75 | +27 |
| 5 | 0.15 | 5,150 | 10 | +40 |

NOTE.—A possible non-uniform crystallinity in the molded test specimens may be reflected in certain of the above values. For instance, sample No. 1 (melt-viscosity, 44) seemingly should have shown a tensile strength and elongation as great as that obtained with sample No. 2 (melt-viscosity, 16), and a brittle temperature no higher than that of sample No. 2. Similarly, sample No. 3 (melt-viscosity, 5.2), seemingly should have shown a tensile strength and elongation greater than that of sample No. 4 (melt-viscosity, 1.9).

This invention is based upon the discovery that polychlorotrifluoroethylene can be stabilized against color development and degradation of melt-viscosity at molding temperatures by intimately dispersing therein a small amount of a salt of an oxyacid of nitrogen, including the metal salts, ammonium salts and amine or carbamide salts. The salts include the nitrates and nitrites of these cations. The metal salts which are particularly useful as stabilizers include the salts of sodium and potassium in group 1 of the periodic table; the salts of magnesium, barium, calcium, strontium, cadmium, mercury and zinc in group 2; and the salts of aluminum in group 3, of zirconium and lead in group 4, and of bismuth in group 5. In addition to the foregoing metal salts which are preferred, the lithium, caesium, silver, gold, titanium, tin, vanadium and antimony salts of the oxyacids of nitrogen can be used with good results. Also, mixtures of the various metal salts, in particular a mixture of potassium nitrate and potassium nitrite, can be used.

From about 0.005 part to 2.5 parts of salt per 100 parts of polychlorotrifluoroethylene resin is useful for my improvement. Larger amounts may be used, if desired, but no added advantage results from the use of more than 2.5 parts per 100 parts of resin. An amount which is about 0.01 to 0.1 part per 100 parts of resin is preferred.

The salt can be dispersed in the resin by any suitable expedient. For instance, the resin and the salt can be dry-mixed or blended in powder form as by finely pulverizing the resin and the salt separately to pass a 100-mesh screen and then intimately mixing and blending them in a suitable mixer or blender. Good distribution of the salt stabilizer can be obtained also by first dissolving in a suitable solvent, for instance, a mixture of isopropanol, 80 parts, and water, 20 parts, and then tumbling the powdered resin with an amount of solution to give the desired salt content. When a salt solution is used, care should be taken to evaporate the solvent slowly to prevent migration of the salt in the final drying of the resin.

In addition to the foregoing method, the stabilizer may be incorporated in the resin by milling on a heated two-roll mill. In addition, the stabilizer may be added to the resin subsequent to the polymerization of the chlorotrifluoroethylene.

Polychlorotrifluoroethylene resins stabilized by a salt intimately dispersed therein in accordance with our discovery can be extruded, molded or the like at temperatures required for such operation without substantial deterioration or loss of essential properties.

The improvement is further illustrated by the following examples:

EXAMPLE I

Various nitrate and nitrite salts were incorporated in polychlorotrifluoroethylene resins as follows:

One part of a 1% solution of the stabilizer in a mixture of 80 parts of isopropanol and 20 parts of water was blended with 10 parts of dry resin and the solvent was removed by drying at 100° C. leaving the stabilizer intimately mixed with the powdered resin. The mixture of resin and stabilizer was then heated for 5 hours at 200° C. to remove all volatile impurities before testing.

The test procedure was as follows:

Ten grams of the mixture of resin and stabilizer were heated for one hour at 300° C. in an open glass tube and then molded at a temperature of 230° C. for five minutes to form disks 1.5 inches in diameter and ⅛ inch in thickness. Test disks have a diameter of five-eighths of an inch were then cut from the molded disks and a melt viscosity determined at 230° C. The melt viscosity of the stabilized resin was compared after heating with the melt viscosity of a control specimen (containing no stabilizer) and with the initial viscosity of the resin prior to heating at 300° C.

The results of the tests are given in the following table:

TABLE IA

*Stabilization of polychlorotrifluoroethylene with nitrate and nitrite salts*

| Stabilizer, 0.1% | 230° C. Melt Viscosity, Megapoises | | Color after heating for 1 hour at 300° C. |
|---|---|---|---|
| | Before Heating | After Heating for 1 hour at 300° C. | |
| Control | 9.6 | 0.6 | amber. |
| Aluminum nitrate | 9.6 | 6.1 | Do. |
| Ammonium nitrate | 9.6 | 1.5 | Do. |
| Barium nitrate | 9.6 | 1.3 | colorless. |
| Bismuth nitrate | 9.6 | 6.1 | Do. |
| Cadmium nitrate | 9.6 | 6.4 | Do. |
| Calcium nitrate | 9.6 | 1.2 | light amber. |
| Lead nitrate | 9.6 | 2.6 | colorless. |
| Magnesium nitrate | 9.6 | 3.0 | amber. |
| Mercuric nitrate | 9.6 | 1.3 | colorless. |
| Methylurea nitrate | 9.6 | 5.4 | amber. |
| Potassium nitrate | 9.6 | 2.0 | colorless. |
| Sodium nitrate | 9.6 | 1.0 | Do. |
| Sodium nitrite | 9.6 | 1.0 | Do. |
| Strontium nitrate | 9.6 | 1.3 | Do. |
| Potassium nitrate-Potassium nitrite | 9.6 | 2.0 | Do. |
| Zinc nitrate | 9.6 | 4.0 | dark amber. |
| Control | 13.1 | 0.1 | black. |
| Aluminum nitrate | 13.1 | 5.6 | amber. |
| Ammonium nitrate | 13.1 | 0.3 | black. |
| Barium nitrate | 13.1 | 1.1 | amber. |
| Bismuth nitrate | 13.1 | 3.2 | Do. |
| Cadmium nitrate | 13.1 | 4.0 | Do. |
| Lead nitrate | 13.1 | 4.0 | Do. |
| Magnesium nitrate | 13.1 | 5.6 | Do. |
| Methylurea nitrate | 13.1 | 0.3 | Do. |
| Potassium nitrate | 13.1 | 3.2 | Do. |
| Potassium nitrite | 13.1 | 1.0 | light amber. |
| Sodium nitrate | 13.1 | 1.2 | colorless. |
| Potassium nitrite-Potassium nitrate | 13.1 | 7.0 | Do. |
| Zinc nitrate | 13.1 | 1.6 | black. |

EXAMPLE II

Various nitrate salts were incorporated in polychlorotrifluoroethylene resins as follows:

Powdered polychlorotrifluoroethylene (20 grams) was thoroughly dried for five hours at 200° C. and then blended with 0.02 gram of the salt stabilizer. This mixture was fluxed on a two-roll mill at 185° C. and further worked in by milling for five minutes at 185° C.

The test procedure was as follows:

Ten grams of the milled sheet were heated for one hour at 300° C. in an open glass tube and then molded at a temperature of 230° C. for five minutes to form disks 1.5 inches in diameter and ⅛ inch in thickness. Test disks having a diameter of ⅝ inch were then cut from the molded disks and melt viscosities determined at 230° C. The melt viscosity of the stabilized resin after heating was compared with the melt viscosity of similarly heated unstabilized resin and with the initial viscosity obtained on samples which were not heated at 300° C.

The results of the tests are given in the following table:

TABLE II

*Stabilization of polychlorotrifluoroethylene with nitrate stabilizers*

| Stabilizer, 0.1% | 230° C. Melt Viscosity, Megapoises | |
|---|---|---|
| | Before Heating | After Heating for 1 Hour at 300° C. |
| Control | 13.1 | 0.25 |
| Ammonium nitrate | 13.1 | 7.0 |
| Barium nitrate | 13.1 | 10.6 |
| Bismuth nitrate | 13.1 | 12.2 |
| Cadmium nitrate | 13.1 | 12.0 |
| Lead nitrate | 13.1 | 7.7 |
| Magnesium nitrate | 13.1 | 13.0 |
| Mercuric nitrate | 13.1 | 0.7 |
| Strontium nitrate | 13.1 | 9.6 |
| Potassium nitrate | 13.1 | 7.6 |
| Zinc nitrate | 13.1 | 12.0 |
| Zirconium nitrate | 13.1 | 9.8 |

EXAMPLE III

Various nitrate and nitrite salts were tested as stabilizers for polychlorotrifluoroethylene resins when subjected to both a heating and an extrusion operation.

The method of sample preparation and testing was as follows:

Five parts of a 1% solution of the salt in a mixture of 80 parts of isopropanol and 20 parts of water were blended with 95 parts of the dry, powdered resin and the blend of stabilizer and resin dried for two hours at 100° C. and then for five hours at 200° C. to remove all volatile impurities. A ten-gram sample was heated for one hour at 300° C. in a glass tube and then molded and tested for viscosity as previously described. Five pounds of each of the compositions were also extruded into a rod of approximately one-eighth inch diameter and of smooth surface from a 1½ inch Modern Plastics Mechinery Company extruder at a rate of about 8 to 10 pounds per hour. The extruded rod was then molded and tested for viscosity as previously described.

The test results were as follows:

TABLE III

*Stabilization of polychlorotrifluoroethylene with nitrate and nitrite salts extrusion tests*

| Stabilizer, 0.05% | 230° C. Melt Viscosity, Megapoises Initial —12.5 | | Color | |
|---|---|---|---|---|
| | After Heating for 1 Hour at 300° C. | After Extruding | After Heating for 1 Hour at 300° C. | After Extruding |
| Control | 0.7 | 1.3 | Amber | Dark amber. |
| Bismuth nitrate | 4.0 | 1.7 | Colorless | Colorless. |
| Cadmium nitrate | 6.0 | 1.6 | Light amber | Light amber. |
| Lead nitrate | 7.8 | 1.7 | Colorless | Grey. |
| Magnesium nitrate | 11.5 | 2.6 | Light amber | Light amber. |
| Potassium nitrate | 10.0 | 2.4 | ----do---- | Colorless. |
| Potassium nitrite | 9.0 | 3.7 | ----do---- | Do. |
| Potassium nitrate and potassium nitrite | 10.0 | 3.5 | Colorless | Do. |

EXAMPLE IV

Potassium nitrite was tested as a stabilizer at different concentrations with several samples of polychlorotrifluoroethylene resins. The method of incorporating the stabilizers and the test methods were the same as described in Example I.

The results of the tests were as follows:

TABLE IV

*Stabilization of polychlorotrifluoroethylene with potassium nitrite effect of concentration*

| Stabilizer | 230° C. Melt Viscosity, Megapoises | | Color after Heating for 1 Hour at 300° C. |
|---|---|---|---|
| | Before Heating | After Heating for One Hour at 300° C. | |
| Control No. 1 | 6.1 | 1.7 | Light amber. |
| Potassium nitrite, 0.02% | 6.1 | 6.1 | Colorless. |
| Potassium nitrite, 0.04% | 6.1 | 4.8 | Do. |
| Potassium nitrite, 0.06% | 6.1 | 3.8 | Do. |
| Control No. 2 | 20 | 0.6 | Light amber. |
| Potassium nitrite, 0.03% | 20 | 3.4 | Colorless. |
| Control No. 3 | 12.5 | 0.7 | Light amber. |
| Potassium nitrite, 0.05% | 12.5 | 9.0 | Colorless. |

EXAMPLE V

Potassium nitrite in different concentrations was tested as a stabilizer for polychlorotrifluoroethylene resins which were subjected to extrusion. The results of the tests are given in the table below.

TABLE V

*Stabilization of polychlorotrifluoroethylene with potassium nitrite*

| Sample No. | Stabilizer | 230° C. Melt Viscosity, Megapoises | | Color after Extruding |
|---|---|---|---|---|
| | | Before Extruding | After Extruding [1] | |
| 1 | Control #1 | 5.2 | 1.6 | Amber. |
| 2 | Potassium nitrite, 0.02% | 5.2 | 4.4 | Light Amber. |
| 3 | Potassium nitrite, 0.04% | 5.2 | 3.5 | Colorless. |
| 4 | Potassium nitrite, 0.06% | 5.2 | 2.5 | Do. |
| 5 | Control #2 | 11.1 | 2.6 | Amber. |
| 6 | Potassium nitrite, 0.02% | 11.1 | 8.9 | Light Amber. |
| 7 | Potassium nitrite, 0.04% | 11.1 | 9.4 | Very light amber. |

[1] See Table VI for extrusion conditions.

TABLE VI

*Extrusion conditions*

| Sample No | 1 | 2 | 3 | 4 | 5 | 6 | 7 |
|---|---|---|---|---|---|---|---|
| Extrusion Temp., °F.: | | | | | | | |
| Cylinders, avg | 460 | 470 | 515 | 525 | 435 | 430 | 460 |
| Head | 490 | 500 | 550 | 535 | 460 | 450 | 520 |
| Die | 605 | 615 | 640 | 590 | 650 | 640 | 600 |
| Resin | 540 | 570 | 580 | 600 | 560 | 540 | 600 |
| Extrusion rate, lb./hr. | 6.5 | 7.9 | 5.9 | 3.6 | 6.2 | 7.8 | 7.8 |

As shown both in this example and in the preceding example, small amounts of the stabilizers are very effective, and the stabilizers are frequently more effective at lower concentrations than at higher concentrations.

What is claimed is:

1. A polychlorotrifluoroethylene resin stabilized against color development and degradation of melt-viscosity at molding temperatures by the presence therein of about 0.01 to 2.5 parts per 100 parts of resin, by weight, of a metal nitrite.

2. A polychlorotrifluoroethylene resin stabilized against color development and degradation of melt-viscosity at molding temperatures by the presence therein of about 0.01 to 0.1 part per 100 parts of resin, by weight, of a metal nitrite.

3. A polychlorotrifluoroethylene resin stabilized against color development and degradation of melt-viscosity at molding temperatures by the presence therein of about 0.01 to 2.5 parts per 100 parts of resin, by weight, of an alkali-metal nitrite.

4. A polychlorotrifluoroethylene resin stabilized against color development and degradation of melt-viscosity at molding temperatures by the presence therein of about 0.01 to 2.5 parts per 100 parts of resin, by weight, of an alkaline-earth metal nitrite.

5. A polychlorotrifluoroethylene resin stabilized against color development and degradation of melt-viscosity at molding temperatures by the presence therein of about 0.01 to 0.1 part per 100 parts of resin, of sodium nitrite.

6. A polychlorotrifluoroethylene resin stabilized against color development and degradation of melt-viscosity at molding temperatures by the presence therein of about 0.01 to 0.1 part per 100 parts of resin, of potassium nitrite.

References Cited in the file of this patent

UNITED STATES PATENTS

| | | |
|---|---|---|
| 2,456,621 | Cheney | Dec. 21, 1948 |
| 2,491,444 | Cox et al. | Dec. 13, 1949 |
| 2,569,524 | Hamilton | Oct. 2, 1951 |
| 2,676,940 | Kenyon | Apr. 27, 1954 |